(12) United States Patent
Kase

(10) Patent No.: US 8,824,342 B2
(45) Date of Patent: Sep. 2, 2014

(54) FIELD COMMUNICATION APPARATUS AND PROCESS CONTROL SYSTEM

(75) Inventor: Shuji Kase, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 130 days.

(21) Appl. No.: 13/355,618

(22) Filed: Jan. 23, 2012

(65) Prior Publication Data

US 2012/0188915 A1    Jul. 26, 2012

(30) Foreign Application Priority Data

Jan. 25, 2011    (JP) .................................. 2011-013041

(51) Int. Cl.
| | |
|---|---|
| *H04L 5/14* | (2006.01) |
| *H04B 1/56* | (2006.01) |
| *G05B 19/042* | (2006.01) |
| *G05B 15/02* | (2006.01) |
| *G05B 9/03* | (2006.01) |

(52) U.S. Cl.
CPC .. *G05B 19/0425* (2013.01); *G05B 2219/34482* (2013.01); *G05B 2219/24028* (2013.01); *G05B 2219/25172* (2013.01); *G05B 2219/24183* (2013.01); *G05B 2219/24187* (2013.01); *G05B 15/02* (2013.01); *G05B 2219/24186* (2013.01); *G05B 2219/34481* (2013.01)
USPC .............................. 370/276; 700/82; 370/227

(58) Field of Classification Search
USPC ............... 340/656; 370/221, 276, 227; 455/7; 700/1, 82
See application file for complete search history.

(56) References Cited

U.S. PATENT DOCUMENTS

| | | | | |
|---|---|---|---|---|
| 4,672,529 | A * | 6/1987 | Kupersmit | .......................... 700/1 |
| 2007/0168058 | A1 | 7/2007 | Kephart et al. | |
| 2008/0225701 | A1 * | 9/2008 | Pimlott | .......................... 370/221 |
| 2010/0123591 | A1 * | 5/2010 | Bauschke et al. | .............. 340/656 |
| 2010/0159823 | A1 * | 6/2010 | Smith | ................................ 455/7 |

FOREIGN PATENT DOCUMENTS

| | | |
|---|---|---|
| CN | 2680677 Y | 2/2005 |
| CN | 2706934 Y | 6/2005 |
| CN | 101004587 A | 7/2007 |
| CN | 101272514 A | 9/2008 |
| JP | 2009-038545 A | 2/2009 |

* cited by examiner

*Primary Examiner* — Helal A Algahaim
*Assistant Examiner* — Mahmoud Ismail
(74) *Attorney, Agent, or Firm* — Sughrue Mion, PLLC

(57) ABSTRACT

A field communication apparatus may include a first communication unit and a second communication unit each of which performs communication between a plurality of field devices and a host device, the first communication unit and the second communication unit constituting a duplex unit, a first explosion-proof housing that accommodates the first communication unit, and a second explosion-proof housing that accommodates the second communication unit. The first communication unit may be capable of being removed from the field communication apparatus while being accommodated in the first housing, and the second communication unit may be capable of being removed from the field communication apparatus while being accommodated in the second housing.

14 Claims, 3 Drawing Sheets

US 8,824,342 B2

FIELD COMMUNICATION APPARATUS AND PROCESS CONTROL SYSTEM

BACKGROUND OF THE INVENTION

1. Field of the Invention

The present invention relates to a field communication apparatus including communication units that perform communication between field devices and a host device. In particular, the present invention relates to an explosion-proof field communication apparatus.

Priority is claimed on Japanese Patent Application No. 2011-013041, filed Jan. 25, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In a process control system used, for example, at an oil plant, a remote input/output device (remote IO) including a communication unit for connection with a field device and a host device may be used. Since the remote input/output device is placed at a site of the plant, the remote input/output device is installed while being accommodated in an explosion-proof box.

Japanese Unexamined Patent Application, First Publication No. 2009-38545 discloses an explosion-proof repeater in which a communication unit is accommodated in a housing having a pressure-resistant and explosion-proof structure.

In a conventional system, when maintenance of a remote input/output device is required due to, for example, failure, operation of a plant needs to stop or hazardous atmosphere needs to be eliminated, and an explosion-proof box needs to be opened to perform maintenance work. Therefore, the plant operation cannot continue during maintenance and a loss is generated during the operation.

SUMMARY

The present invention provides a field communication apparatus capable of improving maintenance.

A field communication apparatus may include: a first communication unit and a second communication unit each of which performs communication between a plurality of field devices and a host device, the first communication unit and the second communication unit constituting a duplex unit, a first explosion-proof housing that accommodates the first communication unit, and a second explosion-proof housing that accommodates the second communication unit. The first communication unit may be capable of being removed from the field communication apparatus while being accommodated in the first housing. The second communication unit may be capable of being removed from the field communication apparatus while being accommodated in the second housing.

The field communication apparatus may further include: a terminal box that connects between the plurality of field devices and the first communication unit and between the plurality of field devices and the second communication unit. The first communication unit may be capable of being removed from the field communication apparatus while being accommodated in the first housing by releasing a connection between the first communication unit and the terminal box, and the second communication unit may be capable of being removed from the field communication apparatus while being accommodated in the second housing by releasing a connection between the second communication unit and the terminal box.

The first communication unit may be capable of being removed from the field communication apparatus while being accommodated in the first housing and the second communication unit may be capable of being removed from the field communication apparatus while being accommodated in the second housing by releasing a connection of a communication path between the first communication unit and the second communication unit.

An operation state of the first communication unit or the second communication unit may be recognized by communication between the first communication unit and the second communication unit via the communication path.

A field communication apparatus may include: a first communication unit and a second communication unit each of which performs communication between a plurality of field devices and a host device, the first communication unit and the second communication unit constituting a duplex unit; a first explosion-proof housing that accommodates the first communication unit; a second explosion-proof housing that accommodates the second communication unit; a first explosion-proof connector that connects the first communication unit with a cable connected to the plurality of field devices or a network connected to the host device; and a second explosion-proof connector that connects the second communication unit with the cable or the network. The first communication unit may be capable of being removed from the field communication apparatus while being accommodated in the first housing by releasing a connection between the first communication unit and the cable or the network by manipulating the first connector. The second communication unit may be capable of being removed from the field communication apparatus while being accommodated in the second housing by releasing a connection between the second communication unit and the cable or the network by manipulating the second connector.

One of the first communication unit and the second communication unit may function as an active communication unit, and the other of the first communication unit and the second communication unit may function as a standby communication unit. The active communication unit and the standby communication unit may basically perform the same process in synchronization. Only the active communication unit may perform output of the plurality of field devices.

The first communication unit may include: a first host communication interface unit that is connected to the network, the first host communication interface unit delivering signals from the plurality of field devices to the host device, the first host communication interface unit delivering a request from the host device to the plurality of field devices; and a first field signal interface unit that is provided between the cable and the first host communication interface unit, the first field signal interface unit collecting signals from the plurality of field devices to transmit the signals to the first host communication interface unit, the first field signal interface unit delivering a request from the first host communication interface unit to each of the plurality of field devices. The second communication unit may include: a second host communication interface unit that is connected to the network, the second host communication interface unit delivering signals from the plurality of field devices to the host device, the second host communication interface unit delivering a request from the host device to the plurality of field devices; and a second field signal interface unit that is provided between the cable and the second host communication interface unit, the second field signal interface unit collecting signals from the plurality of field devices to transmit the signals to the second host communication interface unit, the second field signal interface unit delivering a request from the second host communication interface unit to each of the plurality of field devices.

The first communication unit may further include a first redundancy diagnosis unit. The second communication unit may further include a second redundancy diagnosis unit. The first redundancy diagnosis unit and the second redundancy diagnosis unit may be connected via a diagnosis communication cable. The first redundancy diagnosis unit may confirm an operation state of the second communication unit by exchanging data of the first communication unit and the second communication unit via the diagnosis communication cable. The second redundancy diagnosis unit may confirm an operation state of the first communication unit by exchanging data of the first communication unit and the second communication unit via the diagnosis communication cable.

A determination may be made as to which of the first communication unit and the second communication unit becomes the active communication unit based on an instruction from the host device or a state of the other communication unit determined based on communication via the diagnosis communication cable.

The field communication apparatus may further include: a terminal box that connects the plurality of field devices with the first field signal interface unit via the first connector, the terminal box connecting the plurality of field devices with the second field signal interface unit via the second connector. The first communication unit may be capable of being removed from the field communication apparatus while being accommodated in the first housing by releasing a connection between the first field signal interface unit and the terminal box by manipulating the first connector. The second communication unit may be capable of being removed from the field communication apparatus while being accommodated in the second housing by releasing a connection between the second field signal interface unit and the terminal box by manipulating the second connector.

The first communication unit may be capable of being removed from the field communication apparatus while being accommodated in the first housing and the second communication unit may be capable of being removed from the field communication apparatus while being accommodated in the second housing by releasing a connection between the first redundancy diagnosis unit and the second redundancy diagnosis unit by manipulating the first and second connectors.

A process control system may include: a plurality of field devices; a host device that manipulates the plurality of field devices by communicating with the plurality of field devices; a first communication unit and a second communication unit each of which performs communication between the plurality of field devices and the host device, the first communication unit and the second communication unit constituting a duplex unit; a first explosion-proof housing that accommodates the first communication unit; a second explosion-proof housing that accommodates the second communication unit; a cable that connects the first communication unit and the second communication unit with the plurality of field devices; a network that connects the first communication unit and the second communication unit with the host device; a first explosion-proof connector that connects the first communication unit with the cable or the network; and a second explosion-proof connector that connects the second communication unit with the cable or the network. The first communication unit may be capable of being removed from the process control system while being accommodated in the first housing by releasing a connection between the first communication unit and the cable or the network by manipulating the first connector. The second communication unit may be capable of being removed from the process control system while being accommodated in the second housing by releasing a connection between the second communication unit and the cable or the network by manipulating the second connector.

One of the first communication unit and the second communication unit may function as an active communication unit, and the other of the first communication unit and the second communication unit may function as a standby communication unit. The active communication unit and the standby communication unit may basically perform the same process in synchronization. Only the active communication unit may perform output of the plurality of field devices.

The first communication unit may include: a first host communication interface unit that is connected to the network, the first host communication interface unit delivering signals from the plurality of field devices to the host device, the first host communication interface unit delivering a request from the host device to the plurality of field devices; and a first field signal interface unit that is provided between the cable and the first host communication interface unit, the first field signal interface unit collecting signals from the plurality of field devices to transmit the signals to the first host communication interface unit, the first field signal interface unit delivering a request from the first host communication interface unit to each of the plurality of field devices. The second communication unit may include: a second host communication interface unit that is connected to the network, the second host communication interface unit delivering signals from the plurality of field devices to the host device, the second host communication interface unit delivering a request from the host device to the plurality of field devices; and a second field signal interface unit that is provided between the cable and the second host communication interface unit, the second field signal interface unit collecting signals from the plurality of field devices to transmit the signals to the second host communication interface unit, the second field signal interface unit delivering a request from the second host communication interface unit to each of the plurality of field devices.

The first communication unit may further include a first redundancy diagnosis unit. The second communication unit may further include a second redundancy diagnosis unit. The first redundancy diagnosis unit and the second redundancy diagnosis unit may be connected via a diagnosis communication cable. The first redundancy diagnosis unit may confirm an operation state of the second communication unit by exchanging data of the first communication unit and the second communication unit via the diagnosis communication cable. The second redundancy diagnosis unit may confirm an operation state of the first communication unit by exchanging data of the first communication unit and the second communication unit via the diagnosis communication cable to.

A determination may be made as to which of the first communication unit and the second communication unit becomes the active communication unit based on an instruction from the host device or a state of the other communication unit determined based on communication via the diagnosis communication cable.

The process control system may further include: a terminal box that connects the plurality of field devices with the first field signal interface unit via the first connector, the terminal box connecting the plurality of field devices with the second field signal interface unit via the second connector. The first communication unit may be capable of being removed from the process control system while being accommodated in the first housing by releasing a connection between the first field signal interface unit and the terminal box by manipulating the first connector. The second communication unit may be capable of being removed from the process control system while being accommodated in the second housing by releasing a connection between the second field signal interface unit and the terminal box by manipulating the second connector.

The first communication unit may be capable of being removed from the process control system while being accommodated in the first housing and the second communication unit may be capable of being removed from the process control system while being accommodated in the second housing by releasing a connection between the first redundancy diagnosis unit and the second redundancy diagnosis unit by manipulating the first and second connectors.

According to the field communication apparatus in accordance with the present invention, since the first communication unit is capable of being removed from the field communication apparatus while being accommodated in the first housing and the second communication unit is capable of being removed from the field communication apparatus while being accommodated in the second housing, the standby communication unit among the first communication unit and the second communication unit can be removed from the field communication apparatus in a state in which operation of a plant is maintained.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
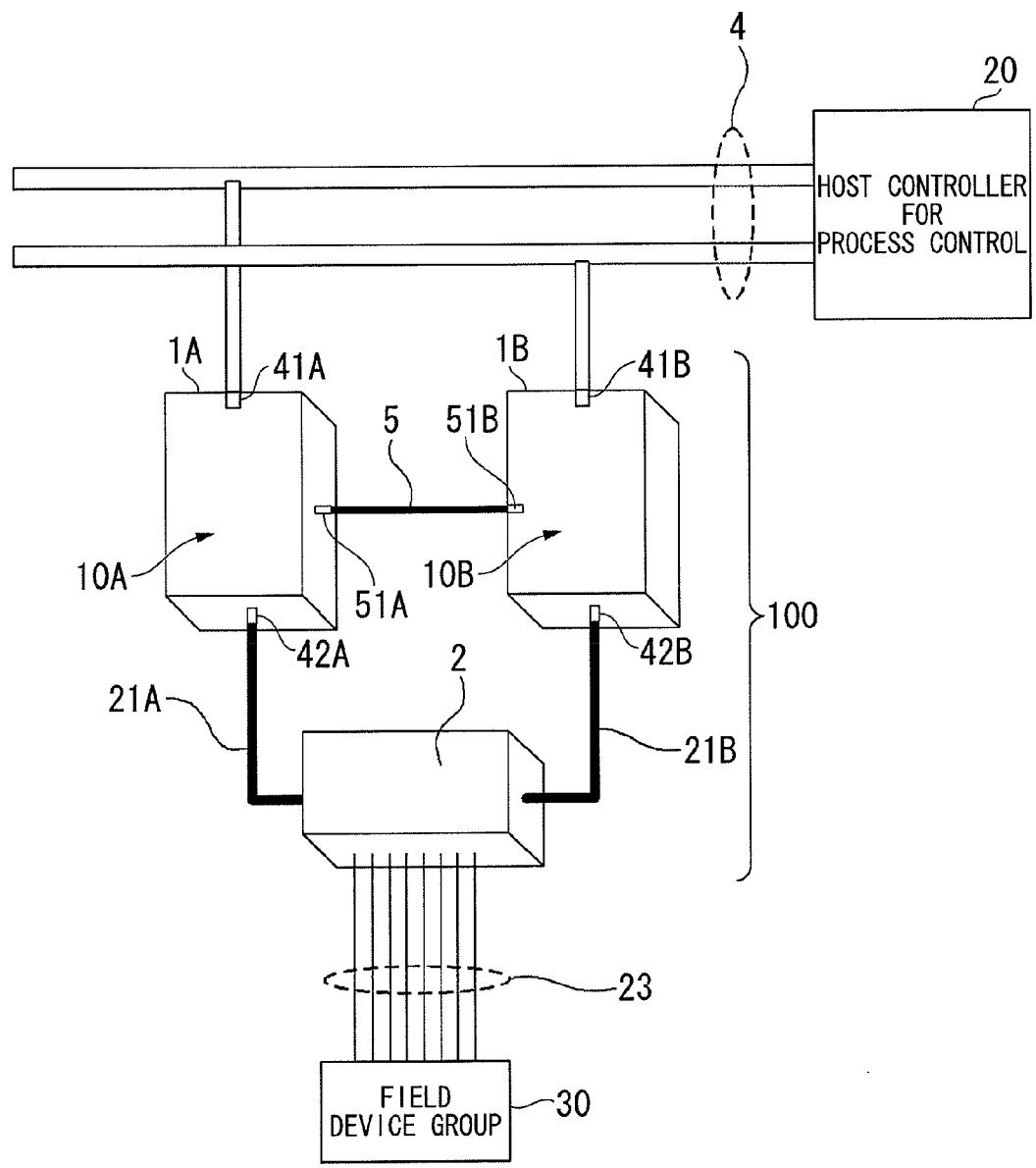
FIG. 1 is a perspective view illustrating a configuration of a field communication apparatus in accordance with a first preferred embodiment of the present invention.
Figure 2:
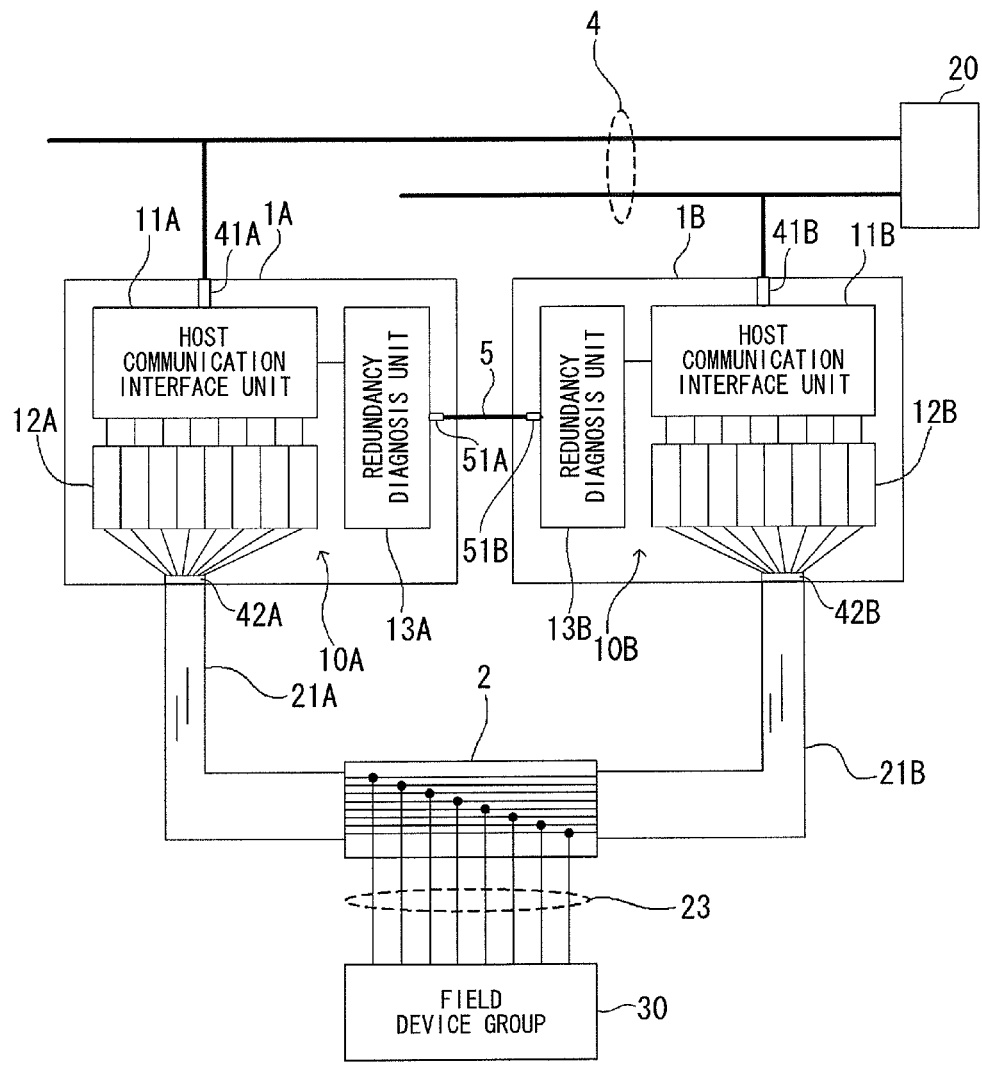
FIG. 2 is a block diagram illustrating the configuration of the field communication apparatus in accordance with the first preferred embodiment of the present invention.

FIG. 1 is a perspective view illustrating a configuration of a field communication apparatus in accordance with a first preferred embodiment of the present invention. FIG. 2 is a block diagram illustrating the configuration of the field communication apparatus in accordance with the first preferred embodiment of the present invention.

As shown in FIGS. 1 and 2, the field communication apparatus 100 in accordance with the first preferred embodiment of the present invention includes a communication unit 10A accommodated in a housing 1A that satisfies an explosion-proof requirement through an enclosed structure, a communication unit 10B accommodated in a housing 1B that satisfies an explosion-proof requirement through an enclosed structure, and a terminal box 2 for relaying a connection between the communication units 10A and 10B and a field device group. Each of the communication unit 10A and the communication unit 10B is connected to a host controller 20 for process control via a host communication network 4, and functions as a remote input/output device for relaying data exchange between the host controller 20 for process control and the field device group 30.

As will be described later, the communication unit 10A and the communication unit 10B constitute a duplex unit. The duplex unit refers to a configuration in which one of the communication unit 10A and the communication unit 10B is active while the other is on standby. The communication unit 10A and the communication unit 10B basically perform the same process, but at least output to the field device group 30 is performed by only the active communication unit. When the active communication unit does not perform operation due to, for example, failure, the standby communication unit newly becomes active and takes over the operation. That is, when the communication unit 10A does not perform the operation due to, for example, failure, the communication unit 10B is newly activated and takes over the operation. When the communication unit 10B does not perform operation due to, for example, failure, the communication unit 10A is newly activated and takes over the operation.

The communication unit 10A is connected to the terminal box 2 via a multi-cable 21A for terminal box connection. The communication unit 10B is connected to the terminal box 2 via a multi-cable 21B for terminal box connection. As shown in FIG. 2, inside the terminal box 2, individual cables of the multi-cable 21A and the multi-cable 21B are connected to each other, and the connected individual cables are connected to cables 23 drawn from the field device group 30, respectively. Thus, the terminal box 2 has a function of merely branching the cables 23 connected to the field device group 30 to the communication unit 10A and the communication unit 10B.

As shown in FIG. 2, the communication unit 10A includes a host communication interface unit 11A connected to the host communication network 4, and a field signal interface unit 12A provided between the multi-cable 21A and the host communication interface unit 11A. The communication unit 10B includes a host communication interface unit 11B connected to the host communication network 4, and a field signal interface unit 12B provided between the multi-cable 21B and the host communication interface unit 11B.

The host communication interface unit 11A collects a signal or a response from each field device 30 via the field signal interface unit 12A and delivers the signal or response to the host controller 20. Further, the host communication interface unit 11A delivers an output request or a communication request from the host controller 20 to each field device 30.

The host communication interface unit 11B collects a signal or a response from each field device 30 via the field signal interface unit 12B and delivers the signal or the response to the host controller 20. The host communication interface unit 11B also delivers an output request or a communication request from the host controller 20 to each field device 30.

The field signal interface unit 12A relays exchange of a signal and communication between each field device 30 and the host communication interface unit 11A. Further, the field signal interface unit 12A may be a combination of units individually allocated to respective field devices or may be configured using a unit for handling a plurality of field devices.

The field signal interface unit 12B relays exchange of a signal and communication between each field device 30 and the host communication interface unit 11B. Further, the field signal interface unit 12B may be a combination of units individually allocated to respective field devices or may be configured using a unit for handling a plurality of field devices.

As shown in FIG. 2, a redundancy diagnosis unit 13A is provided in the communication unit 10A. A redundancy diagnosis unit 13B is provided in the communication unit 10B. The redundancy diagnosis unit 13A and the redundancy diagnosis unit 13B are connected via a diagnosis communication cable 5.

Next, operation of the field communication apparatus of the first preferred embodiment of the present invention will be described.

In the field communication apparatus of the first preferred embodiment of the present invention, one of the communication unit 10A and the communication unit 10B functions as an active communication unit and the other functions a standby communication unit. The active communication unit and the standby communication unit basically perform the same process in synchronization. However, only the active communication unit performs at least output to the field device group 30. The redundancy diagnosis unit 13A and the redundancy diagnosis unit 13B exchange data of the communication unit 10A and the communication unit 10B via the diagnosis communication cable 5 and confirm operation states of the communication unit 10A and the communication unit 10B. The standby communication unit monitors the active communication unit through this communication. A determination is made as to which of the communication units becomes active based on an instruction from the host controller 20 or a state of the other communication unit determined based on the communication via the diagnosis communication cable 5. For example, when the standby communication unit discovers failure of the active communication unit, the standby communication unit becomes an active communication unit and takes over an operation. This enables redundancy of the operation.

Figure 3:
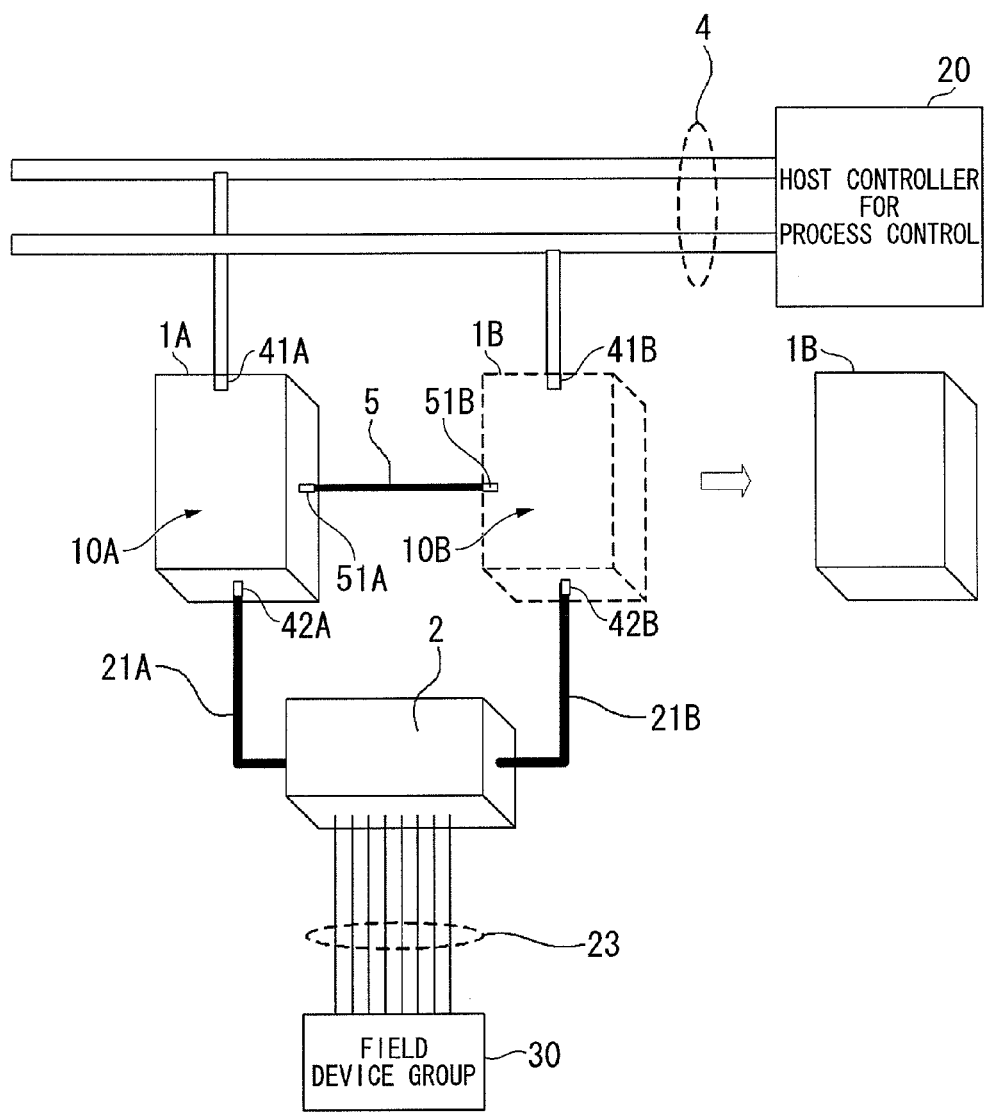
FIG. 3 is a perspective view illustrating a state in maintenance work when a failed communication unit is repaired in the field communication apparatus in accordance with the first preferred embodiment of the present invention.

FIG. 3 is a perspective view illustrating a state in maintenance work when a failed communication unit is repaired in the field communication apparatus in accordance with the first preferred embodiment of the present invention.

As shown in FIG. 3, the communication unit 10A can be removed from the field communication apparatus while being accommodated in the housing 1A. The communication unit 10B can be removed from the field communication apparatus while being accommodated in the housing 1B.

In FIG. 3, a state in which the housing 1B has been removed from the field communication apparatus is shown. The communication unit 10B is connected to the host communication network 4 via a connector 41B satisfying an explosion-proof requirement. The communication unit 10B is connected to the multi-cable 21B via a connector 42B satisfying the explosion-proof requirement. The communication unit 10B is connected to the diagnosis communication cable 5 via a connector 51B satisfying the explosion-proof requirement. A connection state of the communication unit 10B can be released by manipulating the connectors 41B, 42B and 51B. This enables the communication unit 10B to be removed together with the housing 1B satisfying the explosion-proof requirement while being accommodated in the housing 1B.

Similarly, the communication unit 10A is connected to the host communication network 4 via a connector 41A satisfying the explosion-proof requirement. The communication unit 10A is connected to the multi-cable 21A via a connector 42A satisfying the explosion-proof requirement. The communication unit 10A is connected to the diagnosis communication cable 5 via a connector 51A satisfying the explosion-proof requirement. A connection state of the communication unit 10A can be released by manipulating the connectors 41A, 42A and 51A. This enables the communication unit 10A to be removed together with the housing 1A satisfying the explosion-proof requirement while being accommodated in the housing 1A.

Thus, in the field communication apparatus of the first preferred embodiment of the present invention, the communication unit can be removed together with the housing satisfying the explosion-proof requirement while being accommodated in the housing. Accordingly, if the communication unit fails, the other communication unit can be caused to become active and the failed communication unit can be removed. For example, in the example of FIG. 3, the operation of the active communication unit 10A is maintained and the failed communication unit 10B can be removed together with the housing 1B. Thereafter, a new communication unit is installed in the housing, thus enabling a state before the occurrence of the failure to be restored without stopping plant operation.

As described above, according to the field communication apparatus of the first preferred embodiment of the present invention, since the first communication unit can be removed while being accommodated in the first housing and the second communication unit can be removed while being accommodated in the second housing, the standby communication unit among the first communication unit and the second communication unit can be removed in a state in which the plant operation is maintained.

An application range of the present invention is not limited to the above-described preferred embodiment. The present invention may be applied to any field communication apparatus including a communication unit that performs communication between a field device and a host device.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A field communication apparatus comprising:
   a duplex unit including a first communication unit and a second communication unit, a first one of the first and second communication units is active while a second one of the first and second communication units is on standby, the first one performing an operation of communicating between a plurality of field devices and a host device, the second one becoming active and taking over the operation by the first one when the first one is unable to perform the operation;

a first explosion-proof housing that accommodates the first communication unit; and a second explosion-proof housing that accommodates the second communication unit;

wherein the first communication unit comprises:

- a first explosion-proof connector that is removably attached to the first communication unit and configured to connect the first communication unit with a first cable that is connected to the plurality of field devices;
- a second explosion-proof connector that is removably attached to the first communication unit and configured to connect the first communication unit with a network that is connected to the host device; and
- a third explosion-proof connector that is removably attached to the first communication unit and configured to connect the first communication unit with a second cable that connects between the first communication unit and the second communication unit, the second communication unit comprises:

- a fourth explosion-proof connector that is removably attached to the second communication unit and configured to connect the second communication unit with the first cable;
- a fifth explosion-proof connector that is removably attached to the second communication unit and configured to connect the second communication unit with the network; and
- a sixth explosion-proof connector that is removably attached to the second communication unit and configured to connect the second communication unit with the second cable, the first communication unit is capable of being removed from the field communication apparatus while being accommodated in the first housing by releasing a connection between the first communication unit and the first cable by manipulating the first explosion-proof connector, by releasing a connection between the first communication unit and the network by manipulating the second explosion-proof connector, and by releasing a connection between the first communication unit and the second cable by manipulating the third explosion-proof connector, and the second communication unit is capable of being removed from the field communication apparatus while being accommodated in the second housing by releasing a connection between the second communication unit and the first cable by manipulating the fourth explosion-proof connector, by releasing a connection between the second communication unit and the network by manipulating the fifth explosion-proof connector, and by releasing a connection between the second communication unit and the second cable by manipulating the sixth explosion-proof connector.

2. The field communication apparatus according to claim 1, wherein one of the first communication unit and the second communication unit functions as an active communication unit, and the other of the first communication unit and the second communication unit functions as a standby communication unit, the active communication unit and the standby communication unit basically perform a same process in synchronization, and only the active communication unit performs output of the plurality of field devices.

3. The field communication apparatus according to claim 2, wherein the first communication unit comprises:

- a first host communication interface unit that is connected to the network, the first host communication interface unit delivering signals from the plurality of field devices to the host device, the first host communication interface unit delivering a request from the host device to the plurality of field devices; and
- a first field signal interface unit that is provided between the first cable and the first host communication interface unit, the first field signal interface unit collecting signals from the plurality of field devices to transmit the signals to the first host communication interface unit, the first field signal interface unit delivering a request from the first host communication interface unit to each of the plurality of field devices, and the second communication unit comprises:

- a second host communication interface unit that is connected to the network, the second host communication interface unit delivering signals from the plurality of field devices to the host device, the second host communication interface unit delivering a request from the host device to the plurality of field devices; and
- a second field signal interface unit that is provided between the first cable and the second host communication interface unit, the second field signal interface unit collecting signals from the plurality of field devices to transmit the signals to the second host communication interface unit, the second field signal interface unit delivering a request from the second host communication interface unit to each of the plurality of field devices.

4. The field communication apparatus according to claim 3, wherein the first communication unit further comprises a first redundancy diagnosis unit, the second communication unit further comprises a second redundancy diagnosis unit, the first redundancy diagnosis unit and the second redundancy diagnosis unit are connected the second cable, the first redundancy diagnosis unit confirms an operation state of the second communication unit by exchanging data of the first communication unit and the second communication unit via the second cable, and the second redundancy diagnosis unit confirms an operation state of the first communication unit by exchanging data of the first communication unit and the second communication unit via the second cable.

5. The field communication apparatus according to claim 4, wherein a determination is made as to which of the first communication unit and the second communication unit becomes the active communication unit based on an instruction from the host device or a state of the other communication unit determined based on communication via the second cable.

6. The field communication apparatus according to claim 3, further comprising:
a terminal box that connects the plurality of field devices with the first field signal interface unit via the first explosion-proof connector, the terminal box connecting the plurality of field devices with the second field signal interface unit via fourth explosion-proof connector,
wherein the first communication unit is capable of being removed from the field communication apparatus while being accommodated in the first housing by releasing a connection between the first field signal interface unit and the terminal box by manipulating the first explosion-proof connector, and
the second communication unit is capable of being removed from the field communication apparatus while being accommodated in the second housing by releasing a connection between the second field signal interface unit and the terminal box by manipulating the fourth explosion-proof connector.

7. The field communication apparatus according to claim 4, wherein
the first communication unit is capable of being removed from the field communication apparatus while being accommodated in the first housing and the second communication unit is capable of being removed from the field communication apparatus while being accommodated in the second housing by releasing a connection between the first redundancy diagnosis unit and the second redundancy diagnosis unit by manipulating the third explosion-proof connector and the sixth explosion-proof connector.

8. A process control system comprising:
a plurality of field devices;
a host device that manipulates the plurality of field devices by communicating with the plurality of field devices;
a duplex unit including a first communication unit and a second communication unit, a first one of the first and second communication units is active while a second one of the first and second communication units is on standby, the first one performing an operation of communicating between the plurality of field devices and the host device, the second one becoming active and taking over the operation by the first one when the first one is unable to perform the operation;
a first explosion-proof housing that accommodates the first communication unit;
a second explosion-proof housing that accommodates the second communication unit;
a first cable that connects the first communication unit and the second communication unit with the plurality of field devices;
a second cable that connects between the first communication unit and the second communication unit; and
a network that connects the first communication unit and the second communication unit with the host device;
wherein the first communication unit comprises:
a first explosion-proof connector that is removably attached to the first communication unit and configured to connect the first communication unit with the first cable;
a second explosion-proof connector that is removably attached to the first communication unit and configured to connect the first communication unit with the network; and
a third explosion-proof connector that is removably attached to the first communication unit and configured to connect the first communication unit with the second cable,
the second communication unit comprises:
a fourth explosion-proof connector that is removably attached to the second communication unit and configured to connect the second communication unit with the first cable;
a fifth explosion-proof connector that is removably attached to the second communication unit and configured to connect the second communication unit with the network; and
a sixth explosion-proof connector that is removably attached to the second communication unit and configured to connect the second communication unit with the second cable,
the first communication unit is capable of being removed from the process control system while being accommodated in the first housing by releasing a connection between the first communication unit and the first cable by manipulating the first explosion-proof connector, by releasing a connection between the first communication unit and the network by manipulating the second explosion-proof connector, and by releasing a connection between the first communication unit and the second cable by manipulating the third explosion-proof connector, and
the second communication unit is capable of being removed from the process control system while being accommodated in the second housing by releasing a connection between the second communication unit and the first cable by manipulating the fourth explosion-proof connector, by releasing a connection between the second communication unit and the network by manipulating the fifth explosion-proof connector, and by releasing a connection between the second communication unit and the second cable by manipulating the sixth explosion-proof connector.

9. The process control system according to claim 8, wherein
one of the first communication unit and the second communication unit functions as an active communication unit, and the other of the first communication unit and the second communication unit functions as a standby communication unit,
the active communication unit and the standby communication unit basically perform a same process in synchronization, and
only the active communication unit performs output of the plurality of field devices.

10. The process control system according to claim 9, wherein
the first communication unit comprises:
a first host communication interface unit that is connected to the network, the first host communication interface unit delivering signals from the plurality of field devices to the host device, the first host communication interface unit delivering a request from the host device to the plurality of field devices; and
a first field signal interface unit that is provided between the first cable and the first host communication interface unit, the first field signal interface unit collecting signals from the plurality of field devices to transmit the signals to the first host communication interface unit, the first field signal interface unit delivering a request from the first host communication interface unit to each of the plurality of field devices, and the second communication unit comprises:
  a second host communication interface unit that is connected to the network, the second host communication interface unit delivering signals from the plurality of field devices to the host device, the second host communication interface unit delivering a request from the host device to the plurality of field devices; and
  a second field signal interface unit that is provided between the first cable and the second host communication interface unit, the second field signal interface unit collecting signals from the plurality of field devices to transmit the signals to the second host communication interface unit, the second field signal interface unit delivering a request from the second host communication interface unit to each of the plurality of field devices.

11. The process control system according to claim 10, wherein
  the first communication unit further comprises a first redundancy diagnosis unit,
  the second communication unit further comprises a second redundancy diagnosis unit,
  the first redundancy diagnosis unit and the second redundancy diagnosis unit are connected via the second cable,
  the first redundancy diagnosis unit confirms an operation state of the second communication unit by exchanging data of the first communication unit and the second communication unit via the second cable, and
  the second redundancy diagnosis unit confirms an operation state of the first communication unit by exchanging data of the first communication unit and the second communication unit the second cable.

12. The process control system according to claim 11, wherein
  a determination is made as to which of the first communication unit and the second communication unit becomes the active communication unit based on an instruction from the host device or a state of the other communication unit determined based on communication via the second cable.

13. The process control system according to claim 10, further comprising:
  a terminal box that connects the plurality of field devices with the first field signal interface unit via the first explosion-proof connector, the terminal box connecting the plurality of field devices with the second field signal interface unit via the fourth explosion-proof connector,
  wherein the first communication unit is capable of being removed from the process control system while being accommodated in the first housing by releasing a connection between the first field signal interface unit and the terminal box by manipulating the first explosion-proof connector, and
  the second communication unit is capable of being removed from the process control system while being accommodated in the second housing by releasing a connection between the second field signal interface unit and the terminal box by manipulating the fourth explosion-proof connector.

14. The process control system according to claim 11, wherein
  the first communication unit is capable of being removed from the process control system while being accommodated in the first housing and the second communication unit is capable of being removed from the process control system while being accommodated in the second housing by releasing a connection between the first redundancy diagnosis unit and the second redundancy diagnosis unit by manipulating the third explosion-proof connector and the sixth explosion-proof connector.

* * * * *